United States Patent
Hecky et al.

(10) Patent No.: US 9,446,918 B2
(45) Date of Patent: Sep. 20, 2016

(54) METHOD FOR STEERING AN AIRPORT VEHICLE

(71) Applicant: BATTERIE MOBILE, Hericourt (FR)

(72) Inventors: Stephane Hecky, Belfort (FR); Simon Klein, La-Chapelle-Sous-Rougemont (FR)

(73) Assignee: Batterie Mobile, Hericourt (FR)

(*) Notice: Subject to any disclaimer, the term of this patent is extended or adjusted under 35 U.S.C. 154(b) by 0 days.

(21) Appl. No.: 14/392,356

(22) PCT Filed: Jun. 18, 2014

(86) PCT No.: PCT/FR2014/051517
§ 371 (c)(1),
(2) Date: Feb. 5, 2016

(87) PCT Pub. No.: WO2014/207350
PCT Pub. Date: Dec. 31, 2014

(65) Prior Publication Data
US 2016/0176663 A1    Jun. 23, 2016

(30) Foreign Application Priority Data

Jun. 24, 2013 (FR) ..................................... 13 55982

(51) Int. Cl.
*B60P 1/02* (2006.01)
*B65G 67/04* (2006.01)
*B65G 67/24* (2006.01)

(52) U.S. Cl.
CPC ............... *B65G 67/04* (2013.01); *B65G 67/24* (2013.01)

(58) Field of Classification Search
CPC B65G 63/004; B65G 1/0471; B65G 47/514; B65G 63/065; B65G 63/045; B65G 65/00; B65G 67/20; B65G 69/00
USPC .......................... 414/495, 333, 342, 344, 347
See application file for complete search history.

(56) References Cited

U.S. PATENT DOCUMENTS

| | | | |
|---|---|---|---|
| 6,129,025 A * | 10/2000 | Minakami | B60L 5/005 104/288 |
| 7,231,065 B2 * | 6/2007 | Peach | G06K 9/3258 382/104 |
| 7,534,082 B2 * | 5/2009 | Rawdon | B64D 9/00 410/72 |
| 8,490,806 B2 * | 7/2013 | Yurgevich | B60P 1/6481 220/1.5 |
| 8,585,347 B2 * | 11/2013 | Lanigan, Sr. | B66C 19/007 414/342 |
| 8,690,511 B2 * | 4/2014 | Lanigan, Sr. | B61B 1/005 104/29 |
| 9,218,636 B1 * | 12/2015 | Petkov | G06Q 50/28 |
| 2008/0298939 A1 * | 12/2008 | Lanigan, Sr. | B65G 63/065 414/344 |
| 2009/0245990 A1 * | 10/2009 | Lanigan, Sr. | B65G 1/0471 414/495 |

FOREIGN PATENT DOCUMENTS

| | | |
|---|---|---|
| DE | 103 22 824 A1 | 12/2004 |
| EP | 0 302 569 A1 | 2/1989 |
| EP | 0 324 083 A1 | 7/1989 |
| EP | 1 480 097 A2 | 11/2004 |
| WO | 2008 046728 A1 | 4/2008 |
| WO | 2010 064989 A1 | 6/2010 |

* cited by examiner

*Primary Examiner* — Redhwan K Mawari
(74) *Attorney, Agent, or Firm* — Andrew W. Chu; Craft Chu PLLC

(57) ABSTRACT

The method for steering a vehicle for loading and unloading a container includes a driver manually driving the vehicle within a handling area outside the limits of a station specifically dedicated to the loading and unloading of a standardized container, and parking the vehicle in a waiting area. Once parked, the vehicle is handled by automatic steering which automatically actuates at least the control of the path thereof and steers in the reverse direction until the vehicle is positioned within the station. The method includes carrying out the loading or unloading of the container, and steering the vehicle manually or automatically in the forward direction until positioned within the waiting area before giving up the automatic steering so that the driver can manually move the vehicle in the forward direction outside the waiting area.

8 Claims, 1 Drawing Sheet

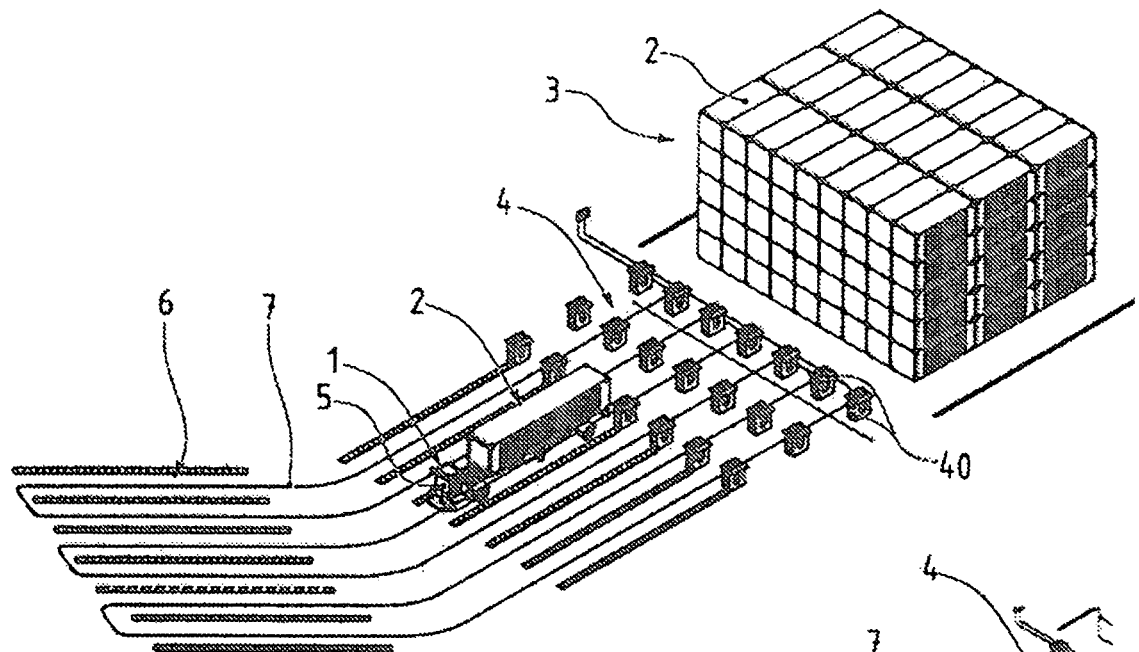
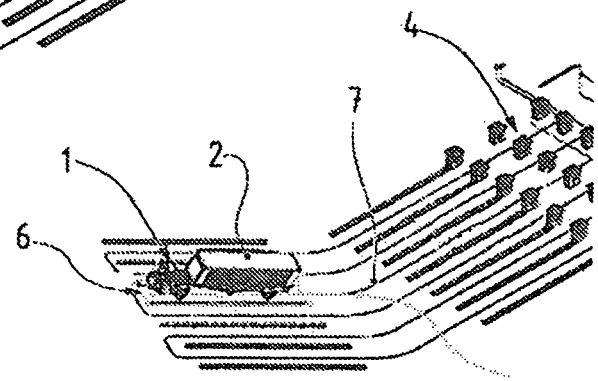
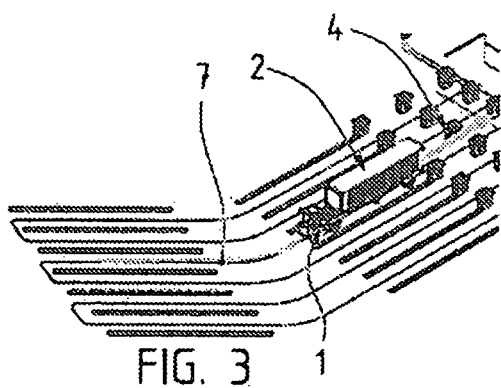
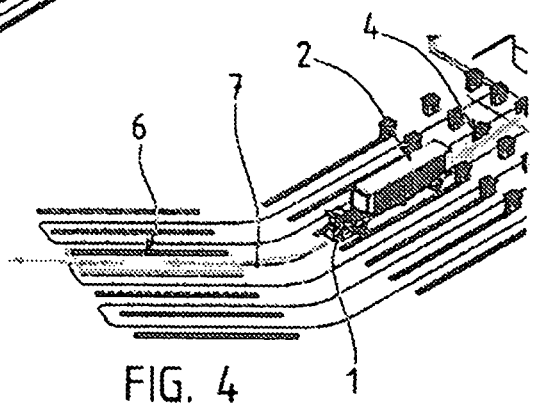

METHOD FOR STEERING AN AIRPORT VEHICLE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention falls within the field of transporting and handling loads, in particular loading and unloading a load exclusively of the container type.

The invention will preferably, but non-limitingly, be applicable to transporting and handling containers within a port zone.

2. Description of Related Art Including Information Disclosed Under 37 CFR 1.97 and 37 CFR 1.98

The In a known manner, a container is an enclosure with standardized dimensions, assuming the form of a parallelepiped block and making it possible to load goods therein for storage and transport, in particular by sea on boats called "container ships".

More specifically, such a container comprises a rectangular parallelepiped structure, each corner of which is equipped with a standardized steel corner, called "ISO corner", connecting vertical metal uprights. Thus, it is possible to stack several containers on top of one another, forming a storage zone. The stacking is done by lifting vehicles from transportation vehicles provided with a platform for receiving one or more containers, and vice versa during unstacking. These operations are carried out by means of a station, or dock, receiving one or more containers so that they can be loaded or unloaded on the platform of the vehicle, or reciprocally during unstacking or stacking from and to the storage zone.

More specifically, a station is made up of at least two guideways extending horizontally, parallel to one another. These guideways have an L-shaped section, turned toward one another, and spaced apart to receive the standardized width of the containers, in order to constitute flat lower longitudinal bearing zones on which the containers rest that are loaded there by the lifting vehicle from the storage zone and unloaded from the vehicle.

In both cases, said vehicle becomes placed within the space arranged between and under the guideways. To that end, the station is raised by means of bases or feet extending vertically and connecting each guideway in the upper portion and at regular intervals. Thus, the vehicle can be positioned below the guideways, in order to load or unload its containers.

It will henceforth be noted that the width of the spacing between the bases and the guideways that they support depends on the standardized width of the containers. Furthermore, given that the vehicle receives one or more containers on its rear platform, its chassis has a width equivalent to their width, but slightly smaller, to be able to perform the positioning maneuvers in order to be inserted, parked and removed from the station. These size constraints require precision in the driving of each vehicle and dexterity from the driver, causing a non-negligible loss of time if the latter is required to start over several times, or risking colliding with the bases of the station and damaging it, as well as the vehicle.

Since the station is raised, the platform of the vehicle is configured as a lift table so as to go from a lower position to an upper position, and vice versa. In the lower position, the height of the platform allows it to pass below the guideways, while in the upper position, the vertical travel of said platform allows it to come above the latter. Furthermore, the lifting means of the vehicle are situated in a centered manner, so as to be deployed and folded back into the space separating said guideways.

More particularly, during the loading of at least one container deposited beforehand on the guideways of the station, the vehicle positions itself within the station, below the guideways. Then, its platform is actuated to raise and lift the container, which then no longer rests on the guideways. Next, this vehicle leaves the station and once again lowers its platform.

During unloading, before positioning itself within the station, the vehicle lifts its platform and the container that rests on top of it. It then parks its chassis below the guideways to next lower the platform again to the lower position, then allowing the container to rest on the guideways. Lastly, it leaves again empty with its platform lowered.

Furthermore, the storage zone being situated at one end of the station, or a set of several stations, the vehicle must park itself in reverse from the opposite end. Once the loading or unloading is done, the vehicle then leaves again by driving forward.

In particular, each vehicle is positioned within a waiting zone, situated near each station, opposite the storage zone. Such a zone extends substantially aligned with each station, forming a circulation corridor. Access to this corridor is allowed by the free space situated between said waiting zone and said station. Thus, a vehicle positions itself in the forward direction within the waiting zone, to next leave in reverse toward the corresponding station by following said corridor.

It will be understood that these maneuvers require great precision to position the vehicle in the station, between the bases and below the guideways, to align perfectly with the latter, so that the container rests on both sides of said guideways, or is perfectly aligned with the platform that will lift it. Such precision has required the implementation of a complex system for automatically guiding vehicles. Furthermore, such a system uses electronic guidance of the vehicle, in particular wire-guided guidance.

Then, from this perspective, the vehicles have been completely automated, eliminating the presence of a driver and a driver station. Thus, said vehicles are similar to motorized platforms, completely independent and controlled by a complex computer system, managing the entire fleet of vehicles for the facility, in particular the port facility. In all, the guidance system is deployed over the entire surface of this port, ensuring the controlled automatic movement of all of the vehicles, in a manner coordinated with one another.

Although such automation, eliminating the human driver, ensures perfect guidance and positioning of the vehicles, it nevertheless has a major drawback. Vehicles moved automatically can only be moved at a limited speed, in order to avoid or anticipate any accident risk. Currently, the travel speed of such automatic vehicles is approximately 5 kilometers per hour (km/h). Given that the entire port fleet is controlled automatically, all of the vehicles travel at the same speed. While this slowness is necessary when each vehicle is being positioned precisely within a station for loading or unloading, it is detrimental in other zones where the vehicles pass, and due to the absence of a driver, it is not possible to consider accelerating the speed for obvious safety reasons.

Furthermore, the vehicles are conveyed along specific circuits extending along guidance means. Although several alternative circuits are possible, no change in trajectory can be considered outside these paths. Flexibility is therefore greatly limited.

Furthermore, in order to avoid collision risks, the circuits are completely reserved for the movements of these automatic vehicles, prohibiting access by people and other types of vehicles. This reservation causes considerable loss of the total space of the port zone. Furthermore, it is necessary to arrange the infrastructure to physically model these spaces reserved for automatic circulation, also creating complexity in its implementation and overlapping of the automatic and non-automatic circuits.

One example of such a solution, specifically targeting the transportation and handling of heavy trucks, with or without trailers, is described in document EP 1,480,097. One can see fully automated guidance, of the wired type, within a zone from an entrance toward an exit, such that each vehicle passes through several stations, always traveling in the forward direction.

In this context, it has been imagined to optimize the circulation of vehicles by combining automatic vehicle guidance with manual driving, reciprocally ensuring precise movements at a safe speed during loading and unloading around the stations and a possibility of increasing the movement speed outside the zones.

Document EP 0,324,083 describes one example system for guiding a transportation and handling vehicle on an aeronautics site. Such a vehicle is guided by a wired system to be positioned automatically in the vicinity of an aircraft, in order to perform a lifting operation of its rear platform, designed to support a case containing baggage. The precision of the guidance must allow the vehicle to position itself perfectly, such that, during the lifting operation, the rear of the platform is as close as possible to the cockpit of the aircraft, across from the access hatches to the cargo bay, but without touching it, which could damage it.

Furthermore, during parking, several vehicles are guided in reverse to be parked parallel to one another, orthogonally and abutting by the rear against the edge of the loading dock, then only requiring precise positioning to stop the rear vehicle as close as possible to said dock and guidance to orient the vehicles parallel to one another.

Outside the vicinity of an aircraft or the loading dock, the vehicles are controlled manually by their driver.

However, this solution is used in the context of an airport, with specific constraints regarding the type of goods to be transported, i.e., baggage, the weight and volume of which is limited, transportable within boxes that can be moved manually.

An alternative guidance technique is described in document WO 2010/064989, allowing the driver to receive driving instructions to park his truck in reverse, orthogonally abutting against a loading dock. This solution is similar to a backup radar, but instead of equipping the truck, it is the loading dock that emits a signal to detect the position of the back of the trailer during reverse maneuvers, to communicate driving instructions to the driver.

Once again, this solution depends on the dexterity of the driver to drive his truck and follow the guidance instructions perfectly.

Furthermore, not all of the existing solutions need precision in the lateral guidance of the vehicle, to be inserted into a confined space with a limited width, so as next to be able to raise or lower its rear platform to go between the guideways of a container handling station.

BRIEF SUMMARY OF THE INVENTION

To that end, the invention precisely relates to a method for guiding a vehicle for transporting, loading and unloading at least one container, within a handling zone equipped with at least one loading and unloading station for said container, said station (4) being made up of at least two guideways mounted on bases and extending horizontally, parallel to one another, and spaced apart to receive the standardized width of said container, making up a raised lower longitudinal bearing zone on which said container rests, said vehicle being sized in terms of width to allow it to pass between the bases of said station and being equipped with a rear lifting platform whereof the width on the one hand allows the departure between the guideways of said station, and on the other hand, the maintenance of said container during loading and unloading operations.

The method successively comprising the following steps:
a driver manually drives said vehicle within said handling zone, outside the immediate vicinity of said station; and
said driver manually positions said vehicle in the vicinity of said station and parks it within a waiting zone.
The method is characterized in that successively:
once parked, said vehicle is handled by automatic guidance, automatically actuating at least the control of the trajectory of said vehicle;
said vehicle is guided automatically in reverse until it is positioned within said station between the bases and below the guideways of said station;
a loading or unloading operation is performed for at least one container reciprocally from said station toward a vehicle, or conversely, through a raising or lowering operation of said platform passing between the guideways;
said vehicle (1) is guided automatically in forward movement outside said station (4) until it is positioned within said waiting zone (6) or driven manually in forward motion by the driver, the driver commanding the lowering of said platform after a loading operation once the vehicle (1) is outside said station (4);

said vehicle is guided automatically in forward motion outside said station until it is positioned within said waiting zone or driven manually in forward motion by the driver, said driver commanding the lowering of said platform after a loading operation once the vehicle is outside said station;

said automatic guidance is abandoned and said driver resumes manual driving; and said driver moves said vehicle forward manually outside said waiting zone.

Furthermore, according to other additional, non-limiting features, when handled by the automatic guidance, the movement speed and the acceleration of said vehicle can be limited below thresholds.

Advantageously, between the positioning in the vicinity of the station and the parking within the waiting zone, said driver can manually activate the raising of the platform of said vehicle in order to unload a container that it supports, then during the unloading operation, the lowering of said platform is commanded manually or automatically.

Preferably, between the positioning in the vicinity of the station and the parking within the waiting zone, the driver can verify that said platform is lowered, then during the loading operation, the lifting of said platform is commanded manually or automatically, then after loading and positioning within said waiting zone, said platform is lowered manually or automatically.

Furthermore, the method can consist of automatically detecting the presence of a load on the platform of said vehicle and commanding its raising and lowering based on the loading or unloading operation to be done during that handling by the automatic guidance means.

In particular, the automatic guidance can be done in a wire-guided manner between said waiting zone and said station, along a corridor extending from one end to the other, opposite end.

According to one specific feature, controlling the trajectory may consist of automatically modifying the orientation of at least one axle of the vehicle, in particular several at the same time.

Lastly, during the automatic guidance, the advancement and braking of the vehicle can be controlled manually by the driver, via actuating by means of the accelerator and brake of said vehicle, reciprocally, in particular the corresponding pedals.

BRIEF DESCRIPTION OF THE SEVERAL VIEWS OF THE DRAWINGS

Other features and advantages of the invention will emerge from the following detailed description of non-limiting embodiments of the invention, in reference to the appended figures.

FIG. 1 diagrammatically shows a perspective three-quarters front and top view of a facility showing a vehicle carrying a container, moving near a loading and unloading station positioned next to a container storage zone.

FIGS. 2-4 show three perspective views similar to FIG. 1, corresponding to three steps during the implementation of the guidance method according to the invention, i.e., the manual driving until parking of the vehicle in the waiting zone; the reverse automatic guidance toward said station along the corridor; and the automatic departure in forward motion from the station to said waiting zone along said corridor followed by the manual exit from said waiting zone.

DETAILED DESCRIPTION OF THE INVENTION

The present invention relates to the guidance of a vehicle 1 for transporting, loading and unloading at least one container 2.

This guidance will be implemented within a handling zone, in particular a port zone, preferably a port.

Such a handling zone may comprise at least one storage zone 3 for several containers 2, stacked on one another, in several rows and columns, as shown in FIG. 1. The storage zone 3 constitutes a buffer within which the containers 2 are provisionally placed, for loading on the vehicles 1, or toward other equipment, in particular boats of the "container carrier" type.

More specifically, for loading on or unloading from a vehicle 1, the handling zone also comprises at least one loading and unloading station 4 or dock near said storage zone 3.

Preferably, several stations 4 are aligned across from the rows of said storage zone 3, in the longitudinal direction of the containers 2.

According to the preferred embodiment, as shown in the figures, each station 4 can be formed by pairs of supports 40 spaced apart transversely along the standard width of the container 2 and longitudinally at regular intervals according to the different standard dimensions of said container 2, in particular its width. According to the embodiment shown as an example, each station 4 comprises three pairs of supports 40.

Furthermore, said supports 40 are raised, on bases whose height is greater than the height of the chassis of said vehicle 1, in particular at least of the rear part of such a chassis, when the latter has its platform in the lower position. Thus, said chassis can be positioned between the two supports 40 of each pair.

To that end, it will be noted that the width of the axles of said vehicle 1 is smaller than the lateral spacing between two supports 40.

In other words, said station 4 is made up of at least two guideways mounted on bases and extending horizontally, parallel to one another, and spaced apart to receive the standardized width of said container, making up a raised lower longitudinal bearing zone on which the container rests. Furthermore, the width of said vehicle 1 is sized to allow it to pass between the bases of said station 4 and is equipped with a rear lifting platform whose width on the one hand allows the departure between the guideways of said station 4, and on the other hand, the maintenance of said container 1 during loading and unloading operations.

One then understands that the automatic guidance of the vehicle 1 in reverse within the station 4, between its bases, below its guideways, must be as precise as possible, to allow the passage and to park it appropriately.

Indeed, oftentimes the free spaces between the vehicle 1 and the bases, as well as between the platform and the guideways of the station 4, do not exceed more than one or two dozen centimeters.

Once the vehicle 1 is positioned in this location, within the station 4, it is possible to load or unload a container.

During loading, from the station 4 toward the vehicle 1, at least one container 2 is transferred from the storage zone 3 toward said station 4 beforehand using appropriate means, in particular a crane. Said container 2 then rests on the top of the supports 40. The vehicle 1 then parks in the station 4, its chassis below the container 2. Raising the platform provided at the rear of said chassis makes it possible to raise the container 2 to another position, above the supports 40.

The vehicle then only needs to advance, lower its platform again, then leave again with the loaded container 2.

During the reverse unloading operation, the vehicle 1 arrives loaded with at least one container 2. Before parking within the station 4, the platform is raised. Once in place within the station 4, said platform is lowered again, to a lower position below the supports 40 in which the container 2 rests on the latter. The vehicle 1 can then extricate itself and leave the station 4. Later, said container 2 may be is handled by the crane to be stored in the storage zone 3.

Advantageously, said vehicle 1 comprises a cabin 5 receiving a driving station and a person qualified to drive and maneuver the vehicle 1. This cabin 5 is situated at the front of said vehicle 1.

Thus, a driver can drive the vehicle 1 manually within said handling zone. This manual driving is done without any constraint outside the vicinity of said station 4. Overall, the driver can control the steering, acceleration and braking, in accordance with the restrictions of the zones he is crossing through.

During this driving, said driver manually positions said vehicle 1 in the vicinity of said station 4 and parks it within a waiting zone 6.

To that end, a waiting zone 6 corresponds to a station 4. Such a waiting zone 6 is situated across from its station 4, in its extension, aligned or, as shown in the figures, inclined relative to the axis of said station 4. This incline facilitates the manual maneuvering during the arrival of a vehicle, as modeled by the arrow shown in FIG. 2.

Furthermore, a passage 7 can be arranged between the end of the station 4 and its waiting zone 6. Thus, a vehicle 1 parks directly in the waiting zone 6 in forward motion, passing through said passage.

Furthermore, the opposite end of each waiting zone 6 is provided to be open, emerging outside the zone, to allow the vehicle 1 to remove itself therefrom by moving forward, more easily without maneuvering. This operation can be done manually.

Thus, a waiting zone 6 and its station 4 form a corridor inside which the vehicle can progress in forward or reverse motion.

According to the embodiment shown in the figures, several waiting zones 6 and stations 5 are positioned next to one another. Certain elements, such as the supports 40 as well as the borders of said waiting zones 6 can be shared by the zones 6 and the adjoining stations 4.

On the whole, the entire approach toward and departure from the waiting zone 6 is done manually by the driver of the vehicle 1. This step is shown in FIG. 2.

Advantageously, once parked within a waiting zone 6, the invention provides for automating at least partially the driving of said vehicle 1 for its approach toward the station 4 for the loading and unloading operations (previously mentioned).

To that end, once parked, said vehicle 1 is handled by automatic guidance, automatically actuating at least the control of the trajectory of said vehicle 1.

In other words, the driver can no longer act on the steering and manually change the orientation of the axles. The automatic guidance then handles orienting the vehicle 1, in particular orienting it during its forward motion toward the station 4, so that it is properly aligned with the latter.

It will be noted that this alignment is done to within several centimeters, in particular at least several millimeters, in particular to within plus or minus ten millimeters, for example plus or minus twenty centimeters on either side of the longitudinal median axis of the station 4.

Said vehicle 1 is then guided automatically in reverse until it is positioned within said station 4. This operation is shown in FIG. 3.

Once in position, a loading or unloading operation is done for at least one container 2 reciprocally from said station 4 toward said vehicle 1, or the vice versa.

More specifically, between the positioning in the vicinity of the station 4 and the parking within the waiting zone 6, said driver can manually activate the raising of the platform of said vehicle 1 for loading of the container 2 that it supports. Then, during the unloading operation, the lowering of said platform can be commanded manually or automatically, in order unload the container(s) 2 on said station 4.

Conversely, between the positioning in the vicinity of the station and the parking within the waiting zone 6, the driver verifies that said platform is lowered, then during the loading operation, the raising of said platform can be commanded manually or automatically, then after loading and positioning within said waiting zone 6, said platform is lowered manually or automatically.

Other alternatives for raising and lowering the platform can be considered, in particular during automatic driving within the corridor between the waiting zone 6 and the station 4, in either direction.

To that end, the guidance method according to the invention can consider automatically detecting the presence of a load on the platform of said vehicle and commanding its raising and lowering based on the loading or unloading operation to be done during handling by the automatic guidance. The driver therefore no longer needs to perform any verification himself, the vehicle 1 being configured automatically for the operation to be done.

Advantageously, said vehicle 1 can next also be guided automatically in forward motion until it is positioned within said waiting zone 6. This exit can also be done manually, the driver then regaining total control over the driving of the vehicle.

Once parked within the latter, said automatic guidance is abandoned and said driver regains manual control. He can manually move said vehicle 1 forward outside said waiting zone 6, in particular passing through the open end of the corridor. Thus removed from the waiting zone 6, once it has passed the vicinity of the station 4, the driver has complete freedom to increase the speed and use the path he wishes to reach his destination.

According to one additional feature, during automatic guidance handling, the movement speed and the acceleration of said vehicle 1 are limited below thresholds. In particular, the speed can be blocked at a maximum of 5 km/h to 10 km/h, preferably less than or equal to 5 km/h.

In relation with this limited speed and acceleration, the control of the advance and braking of the vehicle 1 can be done manually by said driver. Thus, it is always the latter who controls the progression of the advancement, whether forward or in reverse. This human control in particular makes it possible to stop the vehicle 1 in case of emergency, or to avoid a collision with a pedestrian or another vehicle. This manual control can be provided by actuation the accelerator and brake of said vehicle 1, respectively, in particular the corresponding pedals.

Advantageously, several types of guidance can be considered. According to the preferred embodiment, as shown in the figures, the automatic guidance can be done in a wire-guided manner between said waiting zone 6 and said station 4, along a corridor extending from one end to the other, opposite end. Then, additional means can equip the vehicle 1 in order to follow the wired line 7 of said wire-guided guidance means.

Furthermore, such a line 7 can be positioned on the ground, fixed, extending along the longitudinal median axes of the waiting zone 6 and the station 4. The vehicle 1 then comprises additional means for identifying and aligning itself with said line 7. These additional means transmit the commands to change orientation of the axles of the vehicle 1 to control and maintain the alignment with said line 7.

The invention provides that the control of the trajectory consists of automatically modifying the orientation of at least one axle of said vehicle 1. This control is provided by the appropriate additional means, in particular comprising servomotors acting directly or indirectly on the manual steering control.

Essentially, the guidance method according to the invention reiterates one and/or the other of the various aforementioned steps.

Thus, the partially manual and partially automatic guidance combines the advantages of manual driving flexibility outside the loading zone of the station 4 and automatic guidance precision within the latter.

We claim:

1. A guidance method of a vehicle for transporting, loading and unloading at least one container within a handling zone equipped with at least one loading and unloading station for the container, the station being comprised of at least two guideways mounted on bases and extending horizontally, parallel to one another, and spaced apart to receive a standardized width of the container, the container resting on a raised lower longitudinal bearing zone, the vehicle having a width so as to pass between the bases of the station and being comprised of a rear lifting platform, wherein width of the vehicle allows the departure between the guideways of the station and maintenance of the container during loading and unloading operations, the method successively comprising the following steps:

driving the vehicle manually within said handling zone, outside an immediate vicinity of the station; and positioning the vehicle in a vicinity of the station and parked within a waiting zone;

wherein, one parked, the vehicle is handled by automatic guidance, automatically actuating at least control of a trajectory of vehicle, wherein the vehicle is guided automatically in reverse until being positioned within the station between the bases and below the guideways of the station, wherein a loading or unloading operation is performed for at least one container reciprocally from the station toward a vehicle, or conversely, through a raising or lowering operation of the platform passing between the guideways, wherein the vehicle is guided automatically in forward movement outside the station until being positioned within said waiting zone or driven manually in forward motion by the driver, the driver commanding the lowering of said platform after a loading operation once the vehicle is outside the station, wherein automatic guidance is abandoned and driver resumes manual driving, and wherein the driver moves the vehicle forward manually outside said waiting zone.

2. The guidance method according to claim 1, wherein, when handled by automatic guidance, movement speed and acceleration of the vehicle are limited below thresholds.

3. The guidance method according to claim 1, wherein, between the positioning in the vicinity of the station and the parking within the waiting zone, said driver manually activating the raising of the platform of the vehicle in order to unload a container that is supported, then during the unloading operation, the lowering of said platform is commanded manually or automatically.

4. The guidance method according to claim 1, wherein, between the positioning in the vicinity of the station and the parking within the waiting zone, the driver verifies that said platform is lowered, then during the loading operation, the lifting of said platform is commanded manually or automatically, then after loading and positioning within said waiting zone, said platform is lowered manually or automatically.

5. The guidance method according to claim 4, further comprising the steps of: automatically detecting the presence of a load on the platform of the vehicle and commanding its raising and lowering based on the loading or unloading operation to be done during that handling by the automatic guidance means.

6. The guidance method according to claim 1, wherein the automatic guidance is done in a wire-guided manner between said waiting zone and the station, along a corridor extending from one end to the other, opposite end.

7. The guidance method according to claim 1, wherein the step of controlling the trajectory comprises the step of automatically modifying the orientation of at least one axle of the vehicle.

8. The guidance method according to claim 1, wherein, during the automatic guidance, advancement and braking of the vehicle is controlled manually by the driver, via actuating an accelerator and brake of the vehicle, reciprocally, in particular the corresponding pedals.

* * * * *